(12) United States Patent
Karr et al.

(10) Patent No.: US 7,293,154 B1
(45) Date of Patent: Nov. 6, 2007

(54) SYSTEM AND METHOD FOR OPTIMIZING STORAGE OPERATIONS BY OPERATING ONLY ON MAPPED BLOCKS

(75) Inventors: Ronald S. Karr, Sunnyvale, CA (US); Michael Root, San Jose, CA (US); Charles H. Silvers, Santa Clara, CA (US); Deepak Tawri, Pune (IN); Anurag Choudhary, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 384 days.

(21) Appl. No.: 10/992,370

(22) Filed: Nov. 18, 2004

(51) Int. Cl.
*G06F 12/00* (2006.01)
(52) U.S. Cl. .................. 711/202; 711/203
(58) Field of Classification Search ........... None
See application file for complete search history.

(56) References Cited

U.S. PATENT DOCUMENTS 6,571,259 B1    5/2003   Zheng et al.
6,671,773 B2   12/2003   Kazar et al.
6,711,588 B1    3/2004   Yamanaka et al.
2004/0243650 A1* 12/2004 McCrory et al. ........... 707/203
2005/0193245 A1*  9/2005 Hayden et al. ............... 714/13

\* cited by examiner

*Primary Examiner*—Brian R. Peugh
*Assistant Examiner*—Horace L. Flournoy
(74) *Attorney, Agent, or Firm*—Meyertons Hood Kivlin Kowert & Goetzel, P.C.; B. Noël Kivlin (57) ABSTRACT

A system for optimizing storage operations by operating only on mapped blocks may include a first and a second set of one or more storage devices, a virtual device client and a virtual device server. The virtual device server may be configured to aggregate storage in the first set of one or more storage devices into a virtual storage device, and make the virtual device accessible to the virtual device server. In preparation for a synchronization operation, the virtual device server may obtain a map identifying one or more in-use regions of the virtual storage device from the virtual device client. The virtual device server may then perform the synchronization operation by copying the one or more in-use regions of the virtual storage device to the second set of one or more storage devices.

31 Claims, 9 Drawing Sheets

SYSTEM AND METHOD FOR OPTIMIZING STORAGE OPERATIONS BY OPERATING ONLY ON MAPPED BLOCKS

BACKGROUND OF THE INVENTION

1. Field of the Invention

This invention relates to computer systems and, more particularly, to the management of synchronization operations within storage environments employing storage virtualization.

2. Description of the Related Art

Many business organizations and governmental entities rely upon applications that access large amounts of data, often exceeding a terabyte or more of data, for mission-critical applications. Often such data is stored on many different storage devices, which may be heterogeneous in nature, including many different types of devices from many different manufacturers.

Configuring individual applications that consume data, or application server systems that host such applications, to recognize and directly interact with each different storage device that may possibly be encountered in a heterogeneous storage environment would be increasingly difficult as the environment scaled in size and complexity. Therefore, in some storage environments, specialized storage management software and hardware may be used to provide a more uniform storage model to storage consumers. Such software and hardware may also be configured to add storage features not present in individual storage devices to the storage model. For example, features to increase fault tolerance, such as data mirroring, snapshot/fixed image creation, replication, or data parity, as well as features to increase data access performance, such as disk striping, may be implemented in the storage model via hardware or software.

Some of the added storage features, such as the ability to attach additional mirrors to a storage device, or to replicate data at a remote location, may require a synchronization or data copying operation from a set of source storage devices to a set of target storage devices. For example, a newly attached mirror may have to be synchronized with the existing mirror or mirrors of a logical volume being used by a file system. In some cases, a large amount of storage may have been reserved for use at a storage device such as a logical volume, not all of which may be actually in use at the time that a synchronization operation is performed. For example, a mirror of a logical volume may comprise several hundred gigabytes of disk storage, of which only a few tens of gigabytes may be mapped (e.g., into files, directories and file system metadata) by the file system using the logical volume at the time a new mirror is attached. Mapping information identifying the in-use portions of the source storage devices may be available at an application layer (e.g., at a file system), but may not be directly visible at a lower-level storage management layer responsible for performing the synchronization operation (e.g., at a volume manager). The synchronization operation may therefore typically include the copying of large amounts of storage that may not be in use. It may be desirable to make the synchronization operations more efficient by restricting the data blocks copied to those that are in use.

SUMMARY OF THE INVENTION

Various embodiments of a system and method for optimizing storage operations by operating only on mapped blocks are disclosed. According to a first embodiment, a system may include a first and a second set of one or more storage devices, a virtual device client and a virtual device server. The virtual device server may be configured to aggregate storage in the first set of one or more storage devices into a virtual storage device, and make the virtual device accessible to the virtual device server. The virtual device client, such as a file system, may then manage storage within the virtual device using metadata (e.g., file system metadata such as super blocks, inode lists, and free block tables) that may be inaccessible from the virtual device server. Not all the storage of the virtual device may be in use at any given time, and the metadata maintained at the virtual device client may include a map of the storage regions that are in use (or such a map may be derived from the metadata). In preparation for a synchronization operation, the virtual device server may obtain a map identifying one or more in-use regions of the virtual storage device from the virtual device client. The virtual device server may then perform the synchronization operation by copying the one or more in-use regions of the virtual storage device to the second set of one or more storage devices, instead of copying both the in-use and unused regions.

Various kinds of virtualization functions may be provided by the virtual device server in different embodiments. In some embodiments, block virtualization may be employed, e.g., the virtual device may be a logical volume, such as a mirrored logical volume, and the virtual device server may be a volume manager. The virtual device client may be a file system in one embodiment, and a replication manager in another. The synchronization operation may be a mirror synchronization after a mirror attach, a replication operation, a data migration operation, or a recovery operation. In some embodiments, the virtual device server may be configured to revalidate the map after copying the data, for example to identify any changes that may have occurred during the synchronization operation.

In some embodiments, the virtual device server may perform one or more operations to provide a consistent view of unused regions of the virtual device, in addition to synchronizing the in-use regions. According to one such embodiment, the virtual device server may be configured to perform a virtual zeroing operation on a portion of the first set of storage devices that does not overlap with any in-use region of the virtual storage device, and on a portion of the second set of storage devices that does not overlap with a copy of an in-use region of the virtual storage device. In another embodiment, the virtual device server may be configured to identify a request to read a block from a portion of the first set of storage devices that does not overlap with any in-use region as an uninitialized read request, and to copy the block requested in the uninitialized read request to the second set of one or more storage devices.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
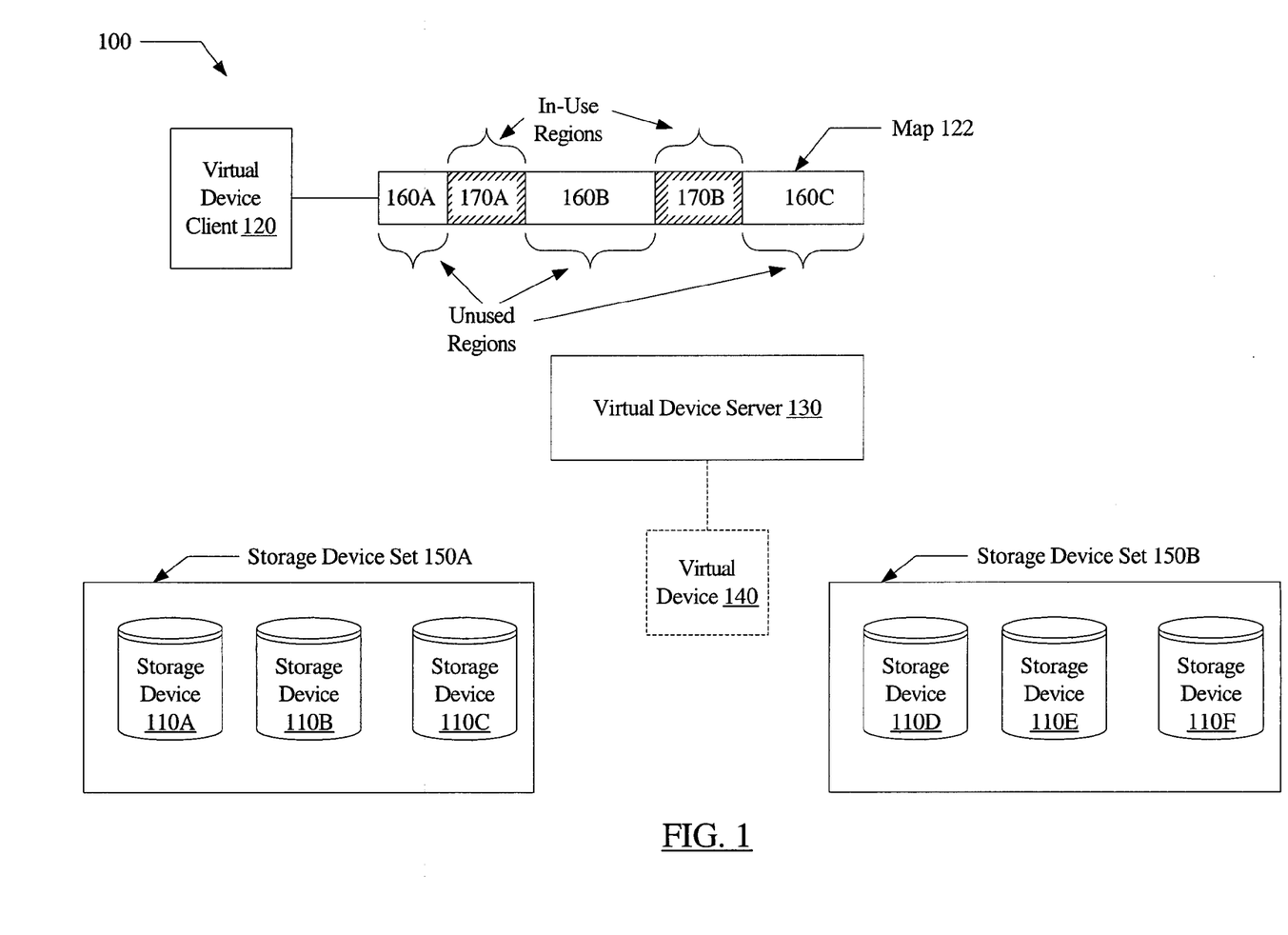
FIG. 1 is a block diagram illustrating one embodiment of a storage system.

FIG. 1 illustrates a storage system 100 according to one embodiment. The system includes a first set (150A) and a second set (150B) of storage devices, a virtual device server 130 and a virtual device client 120. The first set of storage devices 150A may include storage devices 110A-C, and the second set of storage devices 150B may include storage devices 110D-110F. Virtual device server 130 may be configured to aggregate storage in the first set of storage devices 150A into a virtual device 140 and make virtual device 140 accessible to virtual device client 120.

Virtual device client 120 may maintain a map 122 identifying in-use regions 170 (i.e., 170A and 170B) of the address space of virtual device 140. In-use regions may represent the subset of the total storage allocated for virtual device 140 that may contain valid data useful to virtual device client 120, i.e., data that is used to provide the functionality supported by virtual device client 120. Unused regions 160A-160C (collectively, regions 160) of virtual device 140 may represent storage that has been allocated or reserved for use by virtual device client 120, but does not currently contain useful data. Virtual device server 130 may be configured to perform a synchronization operation requiring a copying of data from storage device set 150A to storage device set 150B, for example in response to a configuration change request. As described below in further detail, virtual device server 130 may optimize the synchronization operation by obtaining information contained within map 122 from virtual device client 120, and copying only the in-use regions 170 to storage device set 150B rather than the entire storage allocated to virtual device 140.

Figure 2:
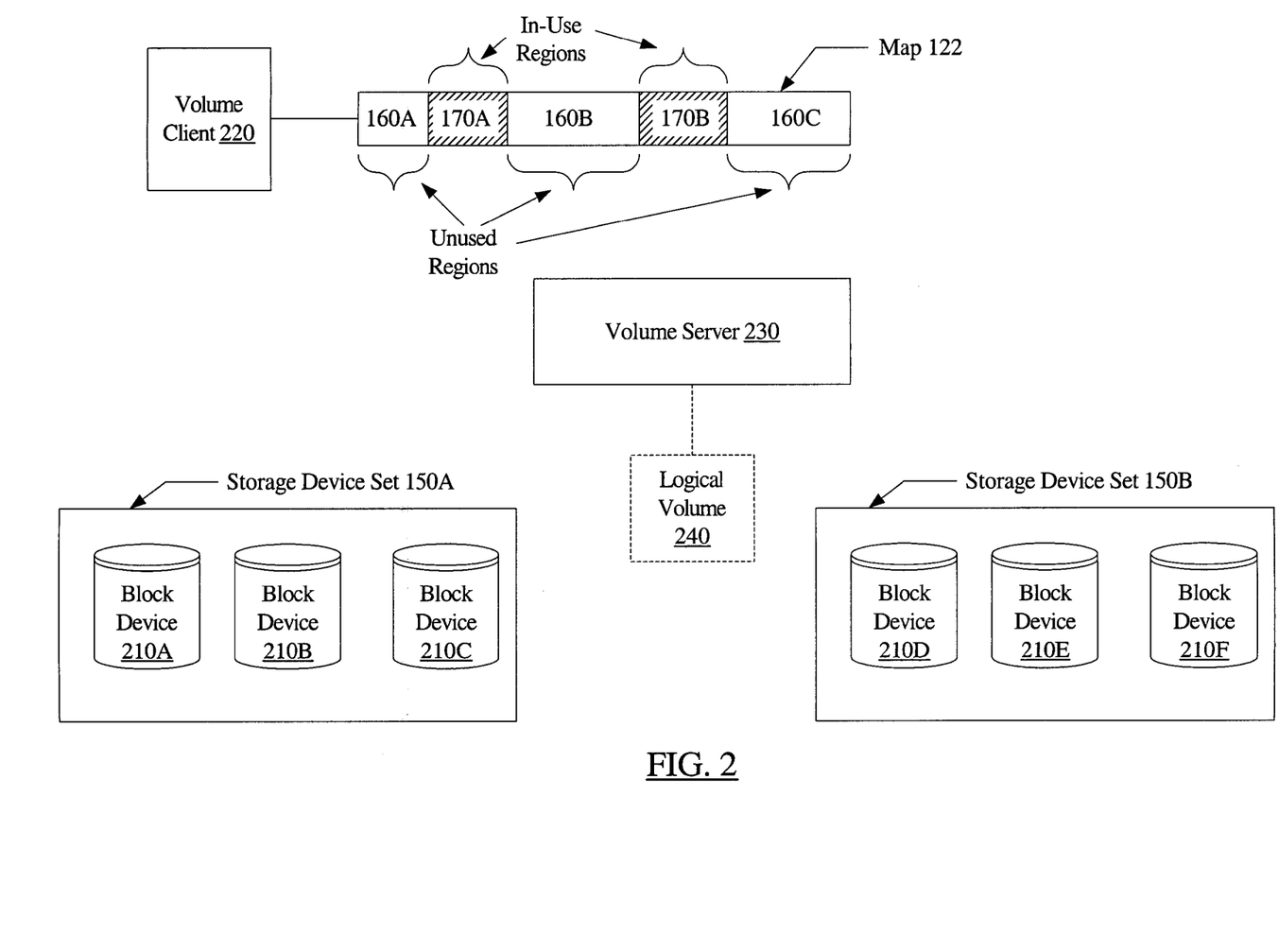
FIG. 2 is a block diagram illustrating one embodiment of a storage system employing block virtualization.

Virtual device server 130 may present virtual storage device 140 using a variety of virtualization primitives in different embodiments, such as virtual blocks or virtual objects such as files, as described in more detail below. In one embodiment, block-based virtualization may be employed, as shown in FIG. 2. That is, storage devices 110 may be block devices 210, and virtual device server 130 may be a volume server (or a volume manager) 230 configured to aggregate storage at block devices 210 into a logical volume 240 (which may also be referred to herein as a volume). Virtual device client 120 may be termed a volume client 220 in such an embodiment.

Generally speaking, a block device may comprise any hardware or software entity that provides a collection of linearly addressed data blocks that can be read or written. For example, in one embodiment a physical block device 210 may be a single disk drive configured to present all of its sectors as an indexed array of blocks. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. In some embodiments, a block device may also be a logical or virtual storage device resulting from a mapping of blocks of one or more physical storage devices, as described in greater detail below.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device may read or write blocks directly to the device, bypassing any file system that may be in use. In some embodiments, a block device 210 presented by an operating system for use by a consumer may present relatively few primitives through which the device may be manipulated. For example, in one embodiment a block device 210 may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices 210 that are physical storage devices, such as disks or tape drives, may be configured to present some form of SCSI interface, though other interfaces are possible and contemplated.

Generally speaking, a volume 240 may comprise a block device that may be presented directly for use by a block device consumer, e.g., a volume client 220. In one embodiment, a volume client 220 may be a file system or an application (such as a database application, for example) that can directly use block devices. As described in greater detail below, in some embodiments employing block device virtualization, a given volume 240 may be associated with several logical or physical block devices. In such embodiments, each block device included in the logical organization of a given volume or virtualized block device may be referred to as a storage object or logical storage object.

A volume may differ from a block device interface implemented in a hardware device or that is accessed through a system disk driver, in that the latter block devices may not present a system-independent block device interface that can be opened for direct use by a consumer. Instead, a system-dependent disk driver may be required to access such block devices. In embodiments employing block virtualization, such a disk driver may be generally unaware of block virtualization and may in some instances present a barrier to using some virtualization techniques, whereas a volume implementing various block virtualization features may be directly accessible by a consumer without the issues presented by such disk drivers.

A volume manager, such as volume server 230, may introduce virtualization of blocks, e.g. in response to a configuration command from a system administrator, creating some number of virtualized block devices out of one or more physical or logical block devices. (In some embodiments, devices such as disk arrays and virtualization switches may also be configured to perform block virtualization.) In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring and other forms of redundant data storage, the ability to create a snapshot or static image of a particular block device at a point in time, and/or the ability to replicate data blocks among storage systems connected through a network such as a local area network (LAN) or a wide area network (WAN), for example. Additionally, in some embodiments virtualized block devices may implement certain performance optimizations, such as load distribution, for example, and/or various capabilities for online reorganization of virtual device structure, such as online data migration between devices. Block virtualization may provide any or all of these capabilities in a fashion transparent to virtualized block device consumers. That is, virtualized block devices may appear as generic storage devices to consumers such as file systems and applications.

Volume server 230 may provide functions such as configuration management of virtualized block devices and distributed coordination of block device virtualization. For example, in one embodiment volume server 230 may be aware of the type and quantity of physical storage devices, such as physical block devices 210, that are available within a storage system. In various embodiments, the virtualization functions provided by volume server 230 may be provided at different levels in the storage hierarchy between a volume client 220 and physical block devices 210.

For example, in one embodiment, volume clients 220 may be provided with a description of a virtualized block device and may be configured to directly access constituent block devices comprising the virtualized device. Such virtualization may also be referred to as host-based or client-based virtualization. In response to a request to configure a virtual block device, for example according to a desired set of virtualization features, volume server 230 may be configured to build a volume description that describes how a collection of storage objects compliant with the desired features maps to underlying physical block devices. The volume description identifying a particular volume 240 may be distributed to one or more volume clients 220. In one embodiment, such a volume description may be a tree of storage objects such as described in greater detail below in conjunction with the description of FIG. 3. Each volume client 220 may be configured to interact with volume server 230 for certain functions, for example management or administrative functions. For typical block read and write activity, each volume client 220 may be configured to interact directly with various block devices 210 according to the volume description distributed by volume server 230.

The structure of the volume 240, for example as indicated by its corresponding storage object tree, may indicate to a given volume client 220 how the volume relates to one or more underlying physical storage devices. In one embodiment, the leaf nodes of such a tree may correspond to one or more physical block devices such as block devices 210, and the root node of such a tree may be a logical block device through which the volume is accessed by a consumer. Distribution of a virtualized block device as a volume to one or more volume clients 220 may also be referred to as distributed block virtualization. In some embodiments, after volume server 230 has distributed a volume description of a given virtual block device to a given volume client 220 as a particular volume 240, the given volume client 220 may interact with that particular volume 240 to read and write blocks without further involvement on the part of volume server 230, as described above. That is, the given volume client 220 may use the structure of the particular volume 240 to transform I/O requests generated by various consumers of that volume 240 into I/O requests directed to specific physical storage devices, such as block devices 210.

In some embodiments, details of block virtualization may not be directly available to individual volume clients 220. In some such embodiments, the virtualization function of volume server 230 may be implemented in a device or layer of abstraction in between volume clients 220 and block devices 210, such as a switch or virtualization appliance. Such virtualization may also be referred to as switch-based or appliance-based virtualization.

Additionally, in some embodiments, multiple layers of virtualization may be employed, for example at the host level as well as at the switch or appliance level. In such embodiments, some aspects of virtualization may be visible to volume clients 220, as in the host-based model, while some aspects may be implemented transparently by an intermediate device, as in the switch-based model. Further, in some multilayer embodiments, the virtualization details of one block device (e.g., one volume 240) may be fully defined to a volume client 220 (i.e., without further virtualization at the switch layer), while the virtualization details of another block device (e.g., another volume) may be partially or entirely transparent to volume client 220.

Figure 3:
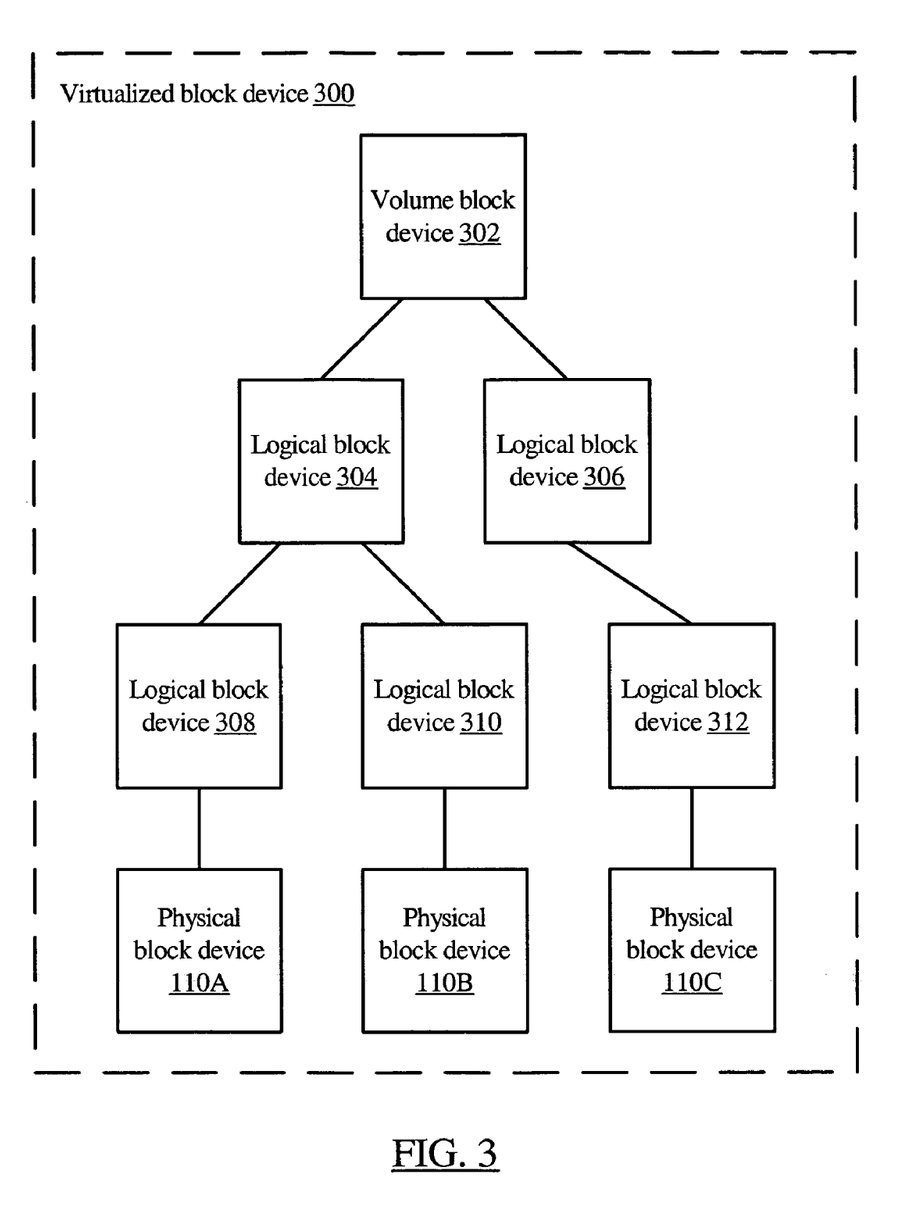
FIG. 3 is a block diagram illustrating one embodiment of a virtualized block device that may be presented as a volume.

One embodiment of a virtualized block device that may be presented to a volume client 220 as a volume 240 is illustrated in FIG. 3. In the illustrated embodiment, virtualized block device 300 includes a volume block device 302 that includes logical block devices 304 and 306. In turn, logical block device 304 includes logical block devices 308 and 310, while logical block device 306 includes logical block device 312. Logical block devices 308, 310, 312 may map to physical block devices 210A-C of FIG. 2.

Virtualized block device 300 may in its entirety represent the structure of the data comprising a given volume 240, which data may be physically stored in physical block devices 210A-C. Volume block device 302 may be configured to be mounted within a file system or presented to an application or other volume consumer as the interface through which the consumer may interact with given volume 240. Each block device that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally, a given block device may be configured to map the logical block spaces of subordinate block devices into its logical block space in various ways in order to realize a particular virtualization function. For example, in one embodiment, virtualized block device 300 may be configured as a mirrored volume, in which a given data block written to virtualized storage device 300 is duplicated, and each of the multiple copies of the duplicated given data block are stored in respective block devices. In one such embodiment, volume block device 302 may be configured to receive an operation to write a data block from a consumer of corresponding volume 240. Volume block device 302 may duplicate the write operation and issue the write operation to both logical block devices 304 and 306, such that the block is written to both devices. In this context, logical block devices 304 and 306 may be referred to as mirrored plexes, mirror devices, or simply mirrors. In various embodiments, volume block device 302 may read a given data block stored in duplicate in logical block devices 304 and 306 by issuing a read operation to one mirror device or the other, for example by alternating devices or defaulting to a particular device. Alternatively, volume block device 302 may issue a read operation to multiple mirror devices and accept results from the fastest responder.

Figure 4:
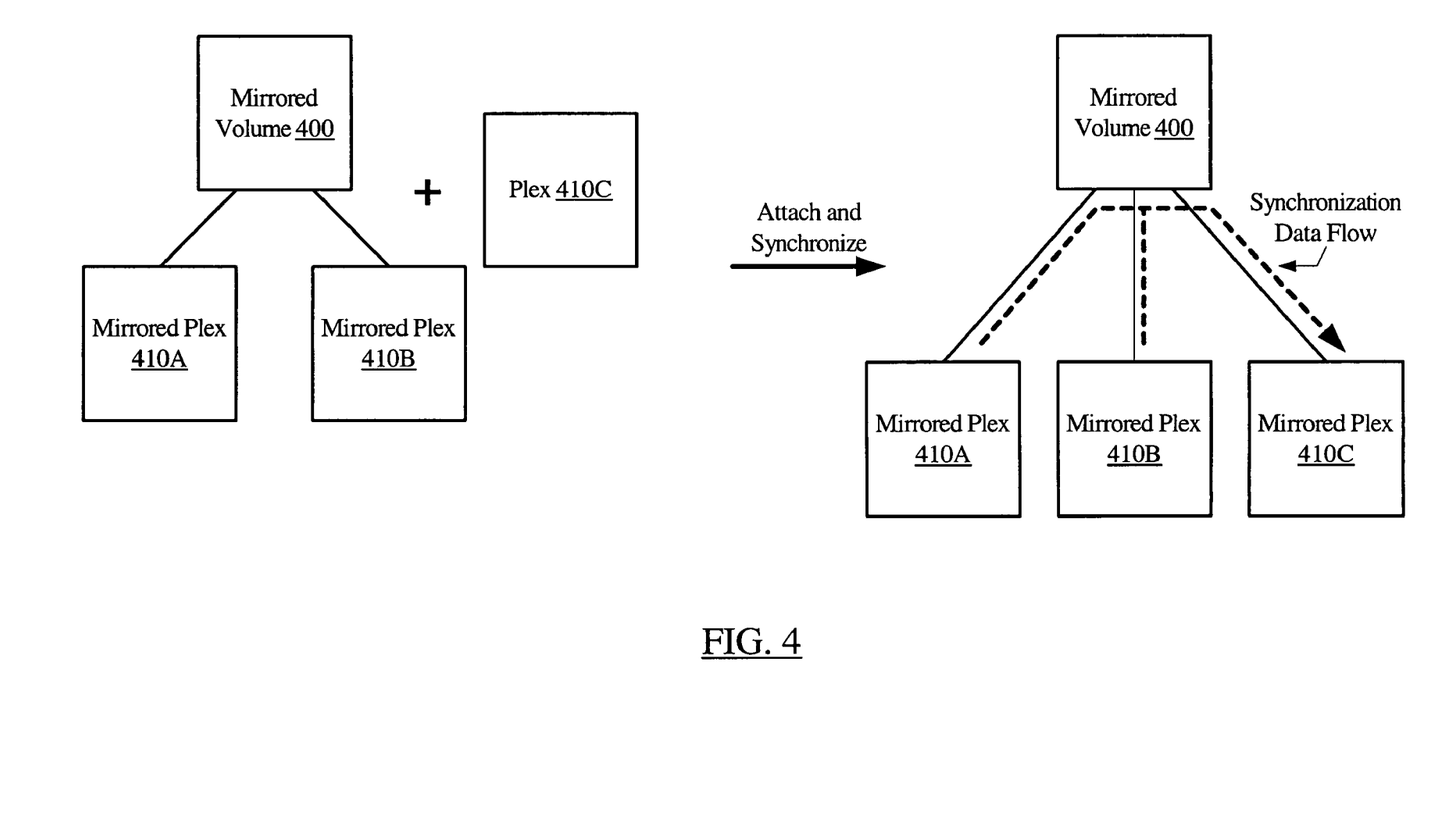
FIG. 4 is a block diagram illustrating an addition of a plex to a mirrored volume

One or more additional mirrors or plexes may be added to a mirrored logical volume, such as volume 302, to support an enhanced level of availability and/or to support functionality such as snapshots. FIG. 4 illustrates an addition (via a mirror attach operation) of a third plex 404C to a mirrored volume 402 containing two existing mirrored plexes 404A and 404B. Prior to the addition of plex 404C, mirrored plexes 404A and 404B may contain identical copies of the data of volume 402. Subsequent to the attach, a synchronization operation may be performed, i.e., data from one or both of the pre-existing plexes 404A-B may be copied to the newly attached plex in order to ensure that all three plexes eventually contain the same data.

As described above and shown in FIG. 3, in some embodiments a virtualized block device 300 may employ multiple layers of virtualization. For example, in the embodiment described above where logical block devices 304 and 306 function as mirror devices, it may be the case that underlying physical block devices 210A-C have dissimilar performance characteristics; specifically, devices 210A-B may be slower than device 210C.

In order to balance the performance of the mirror devices, in one embodiment, logical block device 304 may be implemented as a striped device in which data is distributed between logical block devices 308 and 310. For example, even- and odd-numbered blocks of logical block device 304 may be mapped to logical block devices 308 and 310 respectively, each of which may be configured to map in turn to all or some portion of physical block devices 210A-B respectively. In such an embodiment, block read/write throughput may be increased over a non-striped configuration, as logical block device 304 may be able to read or write two blocks concurrently instead of one. Numerous striping arrangements involving various distributions of blocks to logical block devices are possible and contemplated; such arrangements may be chosen to optimize for various data usage patterns such as predominantly sequential or random usage patterns.

In another aspect illustrating multiple layers of block virtualization, in one embodiment physical block device 210C may employ a different block size than logical block device 306. In such an embodiment, logical block device 312 may be configured to translate between the two physical block sizes and to map the logical block space define by logical block device 306 to the physical block space defined by physical block device 210C. In some instances, the logical block space of logical block device 312 need not be contiguously mapped to blocks of physical block device 210C; an arbitrary mapping may be used.

Numerous other possible configurations of block devices are contemplated that may incorporate more or fewer layers of virtualization to realize within a given instance of virtualized block device 300 virtualization functions similar to or different from those described above. For example, volume block device 302 may employ a greater number of mirror devices, striping may occur higher in the hierarchy than mirroring, certain logical block devices may be configured to perform snapshots of other devices, certain logical block devices may span multiple physical block devices, etc.

In one embodiment, volume server 230 may be configured to read and update configuration information corresponding to volume descriptions (such as a storage object tree corresponding to a given volume) from a configuration database. The configuration information in the database may establish the logical configuration of data on the physical storage devices 210 (e.g., block devices 210A-C). For example, such configuration information may indicate how various logical and physical block devices are divided, striped, mirrored, etc. In one embodiment, the configuration information may be stored on the devices (e.g., block devices 210A-C) that are being virtualized. It is contemplated that in some embodiments, configuration of a given virtualized block device may be managed and/or stored in data structures other than trees of objects. For example, in one embodiment, tables may be used to map virtual block devices to physical storage.

As noted above, the configuration associated with a virtual block device may change over time, such as to add or remove mirrors; migrate data to new storage; increase or decrease the size of the device; create, manipulate, or remove snapshots; add structure for a new capability; etc. In some embodiments, if the volume description of a given volume 240 is distributed to more than one volume client 220, any changes that affect the structure of the given volume 240 may need to be coherently coordinated among the relevant volume clients 220. In one embodiment volume server 230 may be configured to coordinate such changes. For example, volume server 230 may be configured to coordinate quiescence of those volume clients 220 to which the given volume 240 is distributed, in order to temporarily suspend activity to given volume 240. Volume server 230 may further distribute changes to the structure of given volume 240 to relevant volume clients 220 in an effectively atomic fashion, such that either all or none of the relevant clients 220 receive the changes.

In some embodiments, volume server 230 may be configured to distribute all defined volumes 240 to each volume client 220 present within a system. Such embodiments may be referred to as symmetric distributed block virtualization systems. In other embodiments, specific volumes may be distributed only to respective volume clients 220, such that at least one volume 240 is not common to two volume clients 220. Such embodiments may be referred to as asymmetric distributed block virtualization systems.

As noted earlier, a virtual device server 130, such as volume server 230, may receive a configuration command (e.g., through a command-line interface or via a graphical user interface or GUI) from an administrator to create a virtual device 140 out of one or more physical or logical block devices. In some embodiments, the configuration command may specify the amount of storage (e.g., in blocks, kilobytes or megabytes) to be allocated or set aside from the underlying block devices for virtual device 140. The allocated amount of storage may be chosen by the administrator based upon various factors, such as a corporate or data center storage allocation policy (e.g., "a volume to be used for a file system should provide 100 GB of storage"), or an expectation of future use. In many instances it may be hard to anticipate future storage space requirements for a given virtual device, and a generous amount of space may therefore be allocated to avoid frequent reconfiguration requests if space usage increases.

Figure 5:
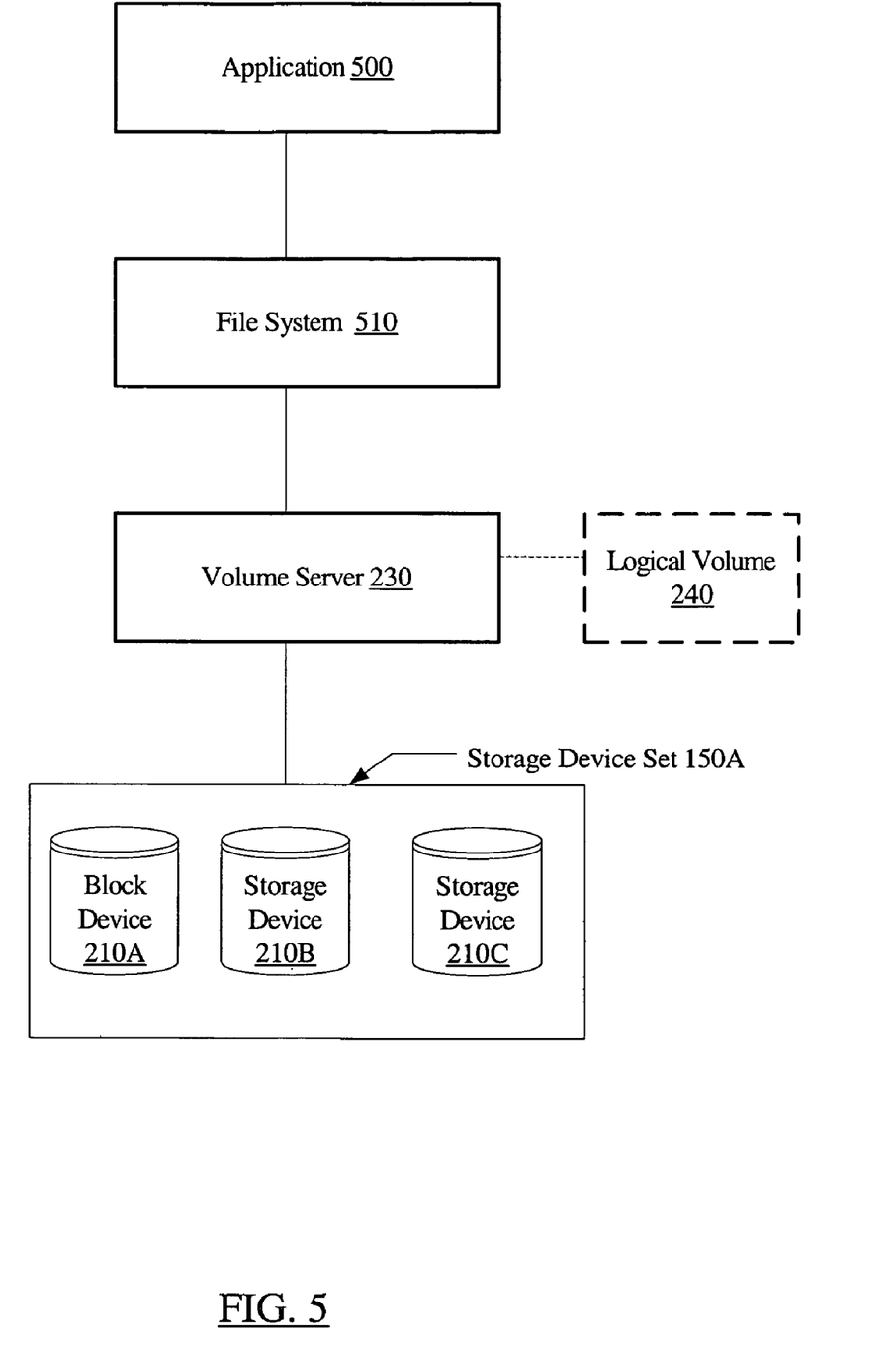
FIG. 5 is a block diagram illustrating one embodiment where a virtual device client is a file system.

Having been provided access to virtual device 140, virtual device client 120 may organize the allocated space in a manner suitable for the specific functionality supported or required by the virtual device client 120. For example, as illustrated in FIG. 5 for one embodiment, virtual device client 120 may be a file system 510, which may use a logical volume 240 provided by a volume manager 230 to store files, directories, and other file system objects such as file system metadata. The files and directories may be used to store the data of one or more applications 500, such as a web server application, an e-mail application, or a database management application. Metadata for file system 510, as described in greater detail below, may include private data used by file system 510 to manage the allocated space and to provide services (e.g., file I/O operations, file and directory lookups, file creation and truncation, etc.), to applications 500 in an efficient manner. File system metadata objects may not be directly accessible from, volume manager 230 or applications 500. File system 510 may be a single-system file system in one embodiment and a clustered file system in another embodiment. In addition, in some embodiments, metadata for file system 510 may be maintained at a file system metadata server (e.g., at an object metadata server in a storage environment employing object storage devices), which may be distinct from one or more servers at which the data of the file system may reside.

Figure 6:
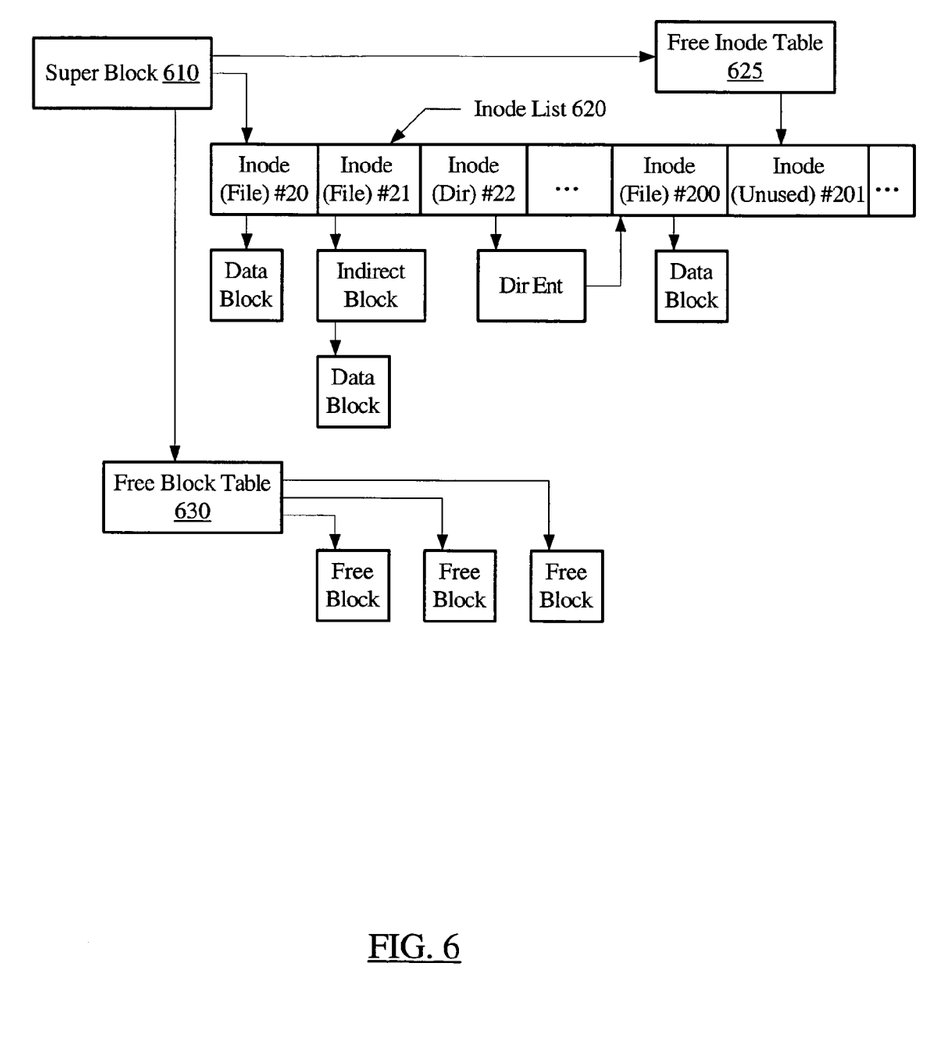
FIG. 6 is a block diagram illustrating file system metadata according to one embodiment.

FIG. 6 is a block diagram illustrating an example of file system metadata according to one embodiment. File system metadata may be stored on a few reserved blocks (such as the initial few blocks) of the virtual address space of underlying volume 240. The remaining blocks of volume 240 may be initially free; that is, they may contain useful data only after an application 500 creates and populates one or more files. File system metadata objects may include a super block 610, an inode list 620, a free inode table 625, and a free block table 630, as shown in FIG. 6. It is noted that the structures illustrated in FIG. 6 represent just one example of file system metadata; in other embodiments and for different kinds of file systems, a variety of other structures may be used, and the structures may contain different kinds of information.

Super block 610 may be used to store several pieces of general information about file system 510, such as the size of the underlying volume, the file system type, file system block size, one or more file system status indicators, file usage statistics, and pointers to other metadata objects such as free block table 630 and free inode table 625. Data containers (i.e., files and directories or folders) of file system 510 may be managed using a data structure called an inode that contains or points to information required to translate file addresses (e.g., logical offsets within a given file) to block addresses (i.e., addresses within the virtual address space of a volume 240). Inodes may also contain other file and directory attributes and properties (e.g., user and group ownership, modification times, access permissions and access control lists). The inodes of file system 510 may be organized as an array or list, such as inode list 620, and each inode may be identified by its index within the list. An inode representing a file, such as inode 20 in FIG. 6, may contain a data block address or pointer specifying the block address of the file's data. (In some embodiments, variable-length extents may be used as the unit of file allocation instead of using fixed-length blocks. An extent may identify a region of one or more contiguous data blocks by using the starting and ending block addresses of the contiguous blocks). For large files, an inode (e.g., inode 21) may point to one or more indirect blocks, which may in turn contain pointers to other indirect blocks or to data blocks. An inode representing a directory (e.g., inode 22) may point to a special kind of data block containing directory entries that in turn point to inodes for the files contained within the directory (e.g., inode 200 may represent a file in the directory represented by inode 22). A free inode table 625 may contain pointers to free inodes (i.e., inodes not currently representing any file or directory) within inode list 620.

Free blocks within the underlying volume 240 (i.e., blocks that do not contain metadata and that are not mapped to a file by any inode) may be accessible via free block table 630, i.e., free block table 630 may provide pointers or contain data structures representing the set of unused blocks of volume 140. When a user of an application 500 requests that a new file be created within file system 510, a free data block may be obtained by the file system using free block table 630 and associated with a free inode from inode list 620. When a file is deleted, its data block or blocks may be marked as free (i.e., free block table 630 may be modified to point to the data block or blocks of the file being deleted), and its inode may be marked as being unused (i.e., free inode table 625 may be modified to point to the inode). It is noted that free inode table 625 may be implemented using any suitable data structure, such as a bitmap, linked list or hash table, in different embodiments. Extent-based representations of free blocks may be used in some implementations to reduce the number of entries that may be required within free block table 630.

Many file systems may have a fast method of computing whether a given data block is in-use or free. Such a method may be used by the file system, for example, for internal operations such as efficient management of file growth. In some log-structured file systems, free blocks may be identified simply as blocks after a current write-point within the file system. In the embodiment illustrated in FIG. 6, a representation of the in-use regions of volume 240 (corresponding to regions 170A and 170B shown in FIG. 1) may be derived using free block table 630 and the knowledge of the size of the volume maintained within super block 610. That is, any block of volume 240 that is not represented within free block table 630 may be considered an in-use block. In some embodiments, file system 510 (or another virtual device client 120) may support one or more specific application programming interfaces or APIs that provide a representation or map of the in-use regions. In other embodiments, file system 510 may simply provide a copy of its free block table 630 via an API, allowing the caller of the API to derive the address ranges of the in-use regions. It is noted that the organization of file system metadata (or the metadata of other virtual device clients 120) may differ from that described above, while still supporting a provision of a map identifying in-use regions of the underlying virtual or physical storage devices. For example, in one embodiment a linked list, a tree, or any other suitable data structure may be used instead of a free block table, and structures other than inodes may be used to represent files and/or directories.

As described previously, volume server 230 may perform a synchronization operation on volume 240 from time to time, for example if a new mirror is attached to volume 240, if a replication operation is to be performed on volume 240, or if there is a crash during a regular write to a mirrored or replicated volume (which requires mirror consistency recovery). In preparation for the synchronization operation, in some embodiments volume server 230 may invoke one or more of the APIs described above to obtain or derive the in-use regions of the address space corresponding to volume 240. Depending on the specific virtualization features being supported within logical volume 240, volume server 230 may perform an additional translation step or steps to convert the in-use address ranges to physical address ranges on block devices 210. Such additional translation steps may be required, for example, in an environment employing multiple levels of virtualization, or where volume client 220 may not be provided with a physical layout of volume 240. Volume server 230 may then copy only the in-use regions of volume 240 to storage device set 150B to complete the desired synchronization operation. Using a single block-level mapping of in-use storage provided by a file system 510 or other virtual device client 120 to restrict the amount of data copied during synchronization may be more efficient than, for example, obtaining a list of all the directories and file contained in the file system, and then recursively traversing the directory structure, copying each directory and each file at each level of the directory structure. Using the mapping of in-use storage may also be more efficient than copying all the blocks, which is a traditional method employed in block-level mirroring operations.

In some embodiments, volume server 230 may also maintain a modification map (e.g., a bitmap) indicative of modifications as seen at the volume server, that may have been made to one or more mirrors of a mirrored logical volume. In such embodiments, e.g., during a volume-level synchronization operation, volume server 230 may use a combination of an in-use map and the modification map to avoid copying modified blocks that are no longer in use. For example, if a file or files is created and then removed, the corresponding blocks may be marked as modified in the modification map, but may still be identified as not being in use according to the in-use map. Such blocks, corresponding to the files that were created and then deleted, may not be copied by volume server 230 during the synchronization.

Figure 7:
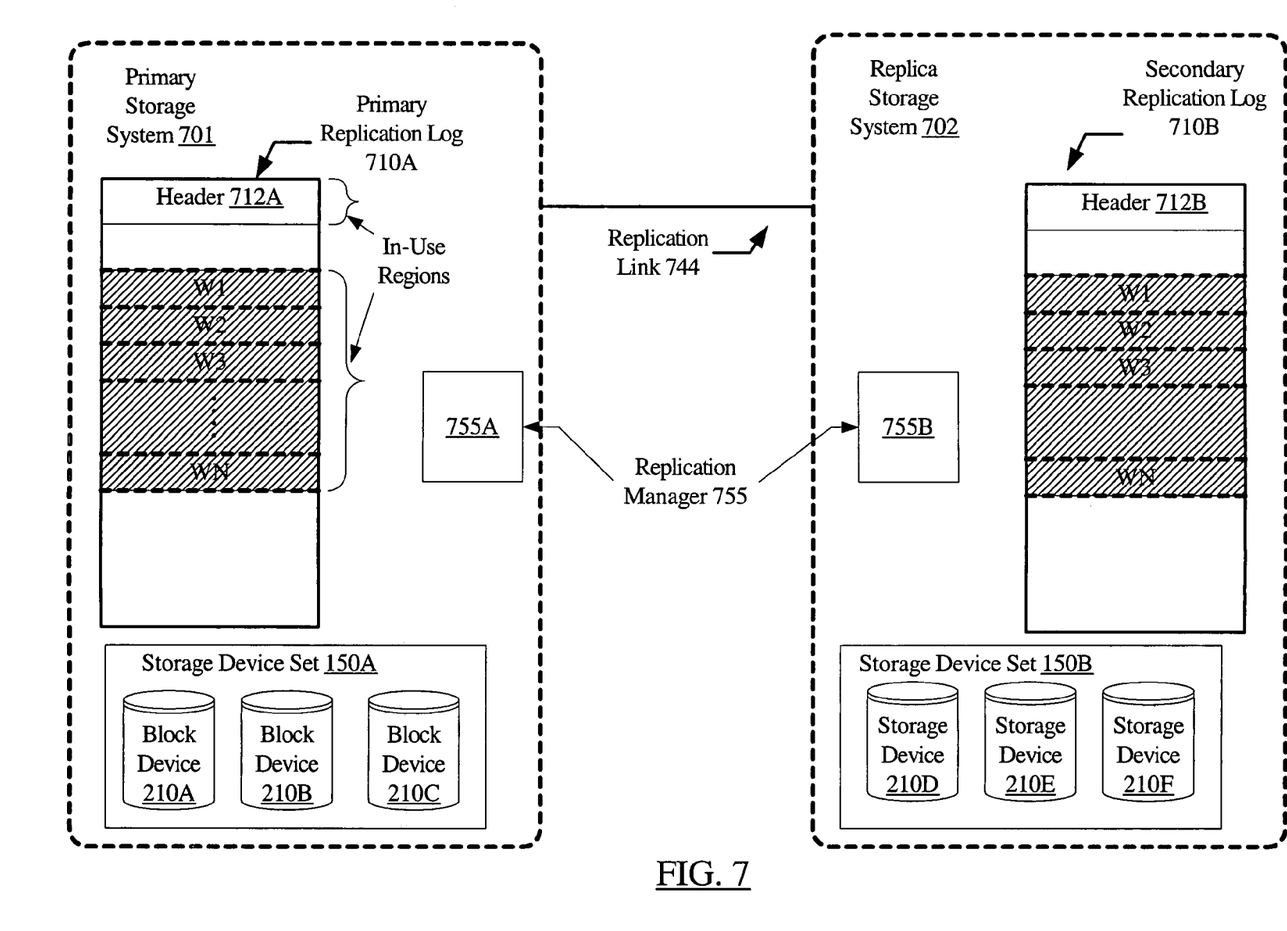
FIG. 7 is a block diagram illustrating one embodiment where a volume client in the form of a replication manager provides mapping information on a logical volume.

Volume clients other than file systems may also provide mapping information identifying in-use regions of a given volume to optimize replication operations. FIG. 7 is a block diagram illustrating one embodiment where a volume client in the form of a replication manager 755 provides mapping information on a logical volume (primary replication log volume 710A) to expedite synchronization required for replication of a primary storage system 701 at a replica storage system 702.

Storage within block devices 210A-C at a primary storage system 701 may be aggregated into one or more volumes 240 by a volume server 230. In order to prevent a complete loss of data at primary storage system (e.g., in the event of a natural disaster or a terrorist attack), a disaster recovery plan may be implemented. The disaster recovery plan may include a replication of volumes 240 at a replica storage system 702. A primary component (755A) of recovery manager 755, incorporated within primary storage system 701, may coordinate the replication operation across a replication link 744 with a secondary component 755B of recovery manager 755, incorporated within replica storage system 702. In some embodiments, primary and replica storage systems may be physically separated to provide a more robust level of disaster recovery, e.g., primary storage system 701 may be located in a different city or even a different country than replica storage system 702. In such embodiments, replication link 744 may be a relatively slow link, for example over a WAN or over the Internet. It may therefore be desirable to limit the amount of data transferred over replication link 744.

Some applications, such as database management applications, may impose certain consistency requirements governing the sequence in which a set of write operations on different volumes 240 may be performed at primary storage system 701. For example, in order to preserve the ACID (atomicity, consistency, isolation, and durability) properties required of an online transaction processing system, a write operation may first have to be performed at a database log volume before a corresponding write operation is performed at a second volume containing database user tables. Such a strict ordering of writes may be required to allow the database management system to recover from a failure or an aborted transaction to a consistent database state. Replication write operations (i.e., write operations performed on block devices 210D-F to create replica volumes) may be performed asynchronously with respect to write operations at source volumes in some embodiments. In order to be able to provide the required transaction processing functionality from replica storage system 702 (e.g., in the event of loss of service at primary storage system 701), replication manager 755 may be required to ensure that write ordering is preserved during replication. That is, in some embodiments replication manager 755 may be required to perform replication write operations at a set of replica volumes in the same sequence in which the corresponding write operations were performed at the respective source volumes. Such a requirement may be known as a "write order fidelity" requirement.

In order to satisfy write order fidelity requirements, in some embodiments replication manager 755 may utilize a primary replication log 710A at primary storage system 701, which may be mirrored (e.g., via a mirror attach) as a secondary replication log 710B at replica storage system 702. A replication log 710 (i.e., 710A or 710B) may store a sequence of entries or records, where each entry contains details of a particular data write operation—for example, the address at which a write operation is to be performed, the contents of the data updated, etc. An entry for each data write targeted at a data volume configured for replication may be entered in replication log 710A, which may itself be configured as a special metadata volume. In some embodiments, an entry in a replication log 710 may include an explicit ordering indicator, such as a sequence number. Entries for database log writes and for user table writes may be created at primary replication log 710A by primary replication manager component 755A, sequenced by the database management system in the order required for database consistency to be maintained. Replication manager 755A may maintain a replication log header 712A that may contain a mapping of the portions of replication log 710A that contain valid data (e.g., the entries that may represent writes performed at primary storage system 701 since an earlier replication operation). For example, in one implementation the portion of replication log 710 used for storing entries representing write operations may be managed as a circular buffer, and replication log header 712A may include a record of the starting and ending entry positions of a region within the circular buffer containing write entries that have not yet been replicated. Data writes at block devices 210A-C for source volumes 240 may be performed by replication manager component 755A in an appropriate consistency-preserving order after the corresponding entries have been made in replication log 710A.

At some appropriate point in time suitable for a replication operation, for example, according to a replication scheduling policy, replication manager component 755A may attach secondary replication log 710B as a mirror to the volume containing replication log 710A, and the two mirrors may be synchronized by a volume server 230. In preparation for the mirror synchronization, volume server 230 may send a request to replication manager 755 for a mapping of in-use regions of replication log 710A, i.e., the regions containing write entries that have not yet been replicated at replica storage system 702. Replication manager 755 may provide a representation of replication log header 712A to volume server 230, which may copy only the in-use regions to replica storage system 702. Thus, instead of copying the entire replication log, only replication log header 712A and entries for write operations W1, W2, W3, . . . WN within in-use regions of replication log 710A may be copied over replication link 744. Replication manager component 755B may then perform replication write operations in the same sequence (W1, W2, W3, . . . WN) on block devices 210D-F, thus satisfying write order fidelity requirements. Any service (e.g., a service similar to replication manager 755) that deploys a data update store such as a log (e.g., similar to the replication log described above) may utilize the above technique of using in-use mappings during synchronization operations. It is noted that a replication manager may be any software module or modules capable of supporting the replication functionality described above, which module or modules may be hosted at one or more computer hosts at primary and replica storage systems.

A mapping of in-use regions may also be used by a replication manager 755 during several other operations related to replication. For example, such a mapping may be used during initial synchronization of a replica, and may also be of use in cases where replication processing has been disabled for a long time (e.g., due to a long-term connection failure), resulting in the filling up of replication log 710A. In such cases where the replication log 710A has filled up, a resynchronization may require a copy of the underlying volume (instead of copying from the replication log). A modification map (e.g., a bitmap) representing modified regions of the volume may be employed to reduce the amount of copying required in such cases during the resynchronization of the replica. However, the in-use map may still be used (in combination with the modification map) to distinguish between in-use and free blocks within modified regions identified by the bitmap. Further, if a file has been written (causing a modification) and is then deleted (causing the blocks to no longer be in-use), the modified region corresponding to the file may not need to be copied if an in-use map is utilized. In-use maps may also be similarly used during mirror recovery after a crash or after transient storage failures.

The replication log volumes corresponding to replication log 710A may be termed content-aware volumes, as they may contain a map or header identifying their valid or in-use data blocks. Similar content-aware volumes may also be employed in other virtualization functions, such as during optimized snapshot operations or fast mirror resynchronization (FMR) operations, where, for example, data updates that have occurred within a specified time period since a previous snapshot update may be logged within one or more volumes. The technique described above, i.e., a provision of mapping information to a volume manager identifying in-use regions of a volume address space to optimize synchronization operations, may be used in various embodiments employing different types of content-aware volumes.

In one embodiment, mapping information identifying in-use regions of a volume address space may be provided to reduce the total amount of data copied to a backup storage device (such as a tape drive) during a backup operation. For example, some backup servers may be configurable to back up data either at a file level or at a block or "raw device" level. Prior to performing a backup operation for a designated set of storage devices at a block level, the backup server may obtain mapping information (e.g., from one or more file systems), indicating the specific subset of blocks of the storage devices that are in use, and may copy only the in-use blocks to a backup storage device. Such an optimized block-level backup operation may be more efficient than a more conventional file-based backup operation, where, for example, the backup server may be required to traverse the directories or folders of one or more file systems and copy each file (or each file modified since a previous backup operation) individually to the backup storage device.

In addition to being used in block virtualization environments as described above, the technique of providing metadata identifying subsets of storage suitable for copying during a synchronization operation may also be employed in storage environments employing other kinds of virtualization, such as object-based virtualization. In an object virtualization environment, a virtual device server 130 may be configured to organize storage within storage devices 110 as higher-level logical objects (such as files) instead of using the block-based interface described above. Virtual storage may be named, managed, and made accessible using any desired base object as implemented by a virtual object device server, such as a file object or a database table object. Thus, in one embodiment, an object storage consumer may be presented with a virtual storage device 140 consisting of a collection of named files, and may perform file-based operations (such as reads from a file, writes to a file, increasing the size of a file, truncating a file, etc.) directly on the virtual storage device. Object-based virtualization may thus allow the offloading of functionality traditionally performed at a host computer system (such as the translation of a file name and offset within a file to a block device address) to a storage device such as an object storage device or OSD that may be optimized to perform the needed storage operations, freeing up resources at the host computers. In addition, once virtual objects have been created and configured, a virtual object device server may distribute metadata on the virtual objects to object storage consumers, allowing the object storage consumers to perform input/output (I/O) operations on the virtual objects without further interaction with virtual object device server. An object storage consumer may maintain a mapping similar to map 122, identifying in-use objects or in-use regions within an object device. In preparation for a synchronization operation, a virtual object device server may obtain the mapping from the object storage consumer, and may copy only the in-use objects or regions.

Figure 8:
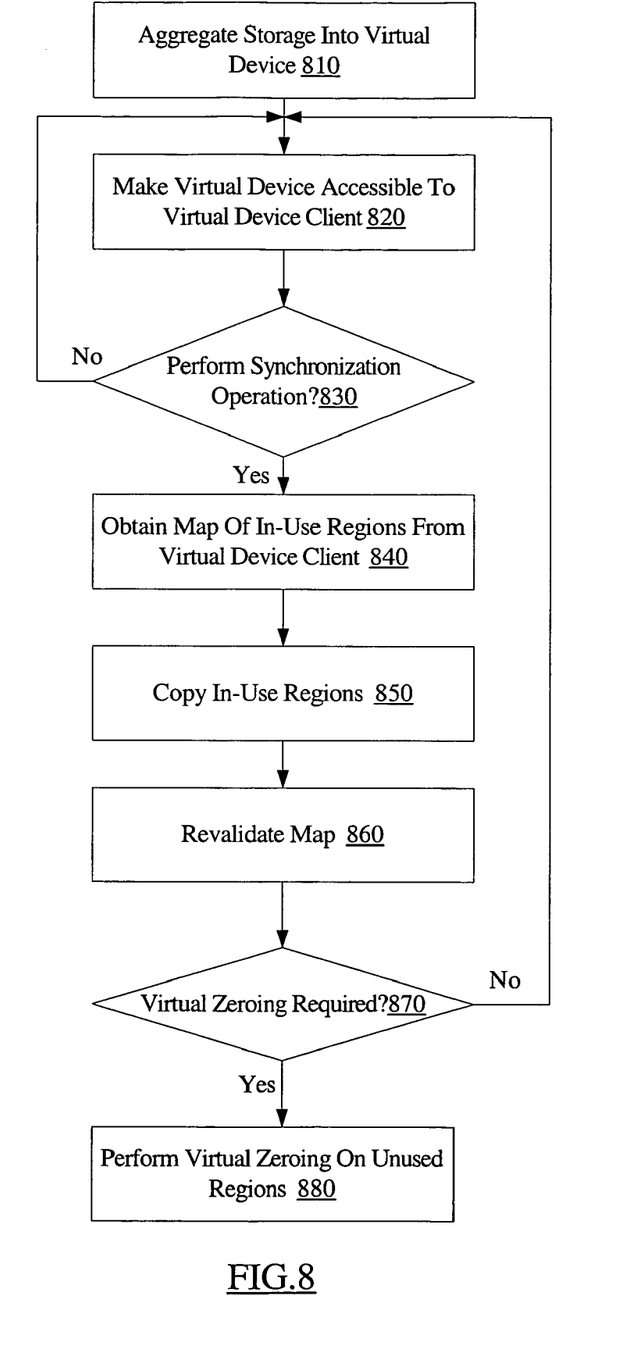
FIG. 8 is a flow diagram illustrating aspects of the operation of a virtual device server configured to obtain a mapping of in-use regions of a virtual device from a virtual device client according to one embodiment.

FIG. 8 is a flow diagram illustrating aspects of the operation of one embodiment of storage system 100, where a virtual device server 130 obtains a mapping of in-use regions of a virtual device 140 from a virtual device client 120 (such as file system 510, replication manager 755, or an object storage consumer) as described above. When a synchronization operation is to be started (block 810), virtual device server 130 may obtain a mapping from virtual device client 120 identifying in-use regions of virtual device 140 (block 840) and may then copy the in-use regions to a second set of storage devices 150B (block 850).

In some embodiments, storage consumers such as application 500 may continue to perform I/O on a virtual device client 240 while the synchronization operation is performed, or one or more I/O operations may be in progress at the time the synchronization operation is begun. As a result, the mapping used by virtual device server 130 may be out-of-date when the synchronization operation is completed; i.e., there may be more or fewer in-use data blocks within a source volume 240 at the end of the synchronization operation than there were at the beginning, depending on the kind of I/O (creates/appends/deletes etc.) performed or completed during the interim. In such embodiments, volume server 230 may be configured to revalidate the mapping after the completion of the synchronization operation, as shown in block 860 of FIG. 8. For example, a volume server 230 may retain the original mapping identifying the in-use regions of volume 240 provided by a file system 510 prior to the synchronization operation, and may request a second mapping after the synchronization has been completed. If the in-use regions identified using the second mapping differ from the in-use regions identified using the first mapping, in some embodiments, volume server 230 may be configured to attempt one or more resynchronization operations (blocks 862, 864) to update the copied version of the data blocks in accordance with the latest changes at a source volume 240. In some rare cases, the entire region (e.g., a few megabytes) involved in recovery may need to be resynchronized. However, such cases may be infrequent enough that the overhead for such resynchronization may typically be fairly low.

In some embodiments, a virtual device server 130 may be configured to provide a consistent view of unused regions of a virtual device 140 (e.g., regions 160 of map 122) across the source and target storage device sets 150A and 150B, in addition to synchronizing the in-use regions of virtual device 140 across the two sets of storage devices. Under normal operating conditions, the contents of an unused or unmapped block of data within virtual device 140 may not affect any operations of, or functionality provided by, a virtual client 120 such as file system 510. However, under certain error conditions (e.g., when a file system recovery after a system crash is interrupted by a second system crash), a virtual device client may attempt to access unused or uninitialized data blocks of virtual device 140, and may perform one or more operations based on the contents of the unused data blocks, which may result in data corruption or metadata corruption. In order to reduce any harmful consequences of accesses to unused or uninitialized data, a technique called virtual zeroing may be employed (blocks 870 and 880 of FIG. 8) in some embodiments. In virtual zeroing, the unused regions of source and target storage devices may be "virtually" filled with zeroes; that is, any request to read a block from an unused region of a virtual device may be trapped before an actual physical read operation on the underlying physical storage devices is performed, and a block filled with zeroes may be returned to the requester. It is noted that virtual zeroing may not require physical writing of data blocks of unused regions of virtual device 140 within storage devices 110; instead, an indication or map of the unused regions as being filled with zeroes may be maintained as part of the metadata of virtual device 140, and may be distributed along with the remaining metadata to virtual device clients in some embodiments.

Figure 9:
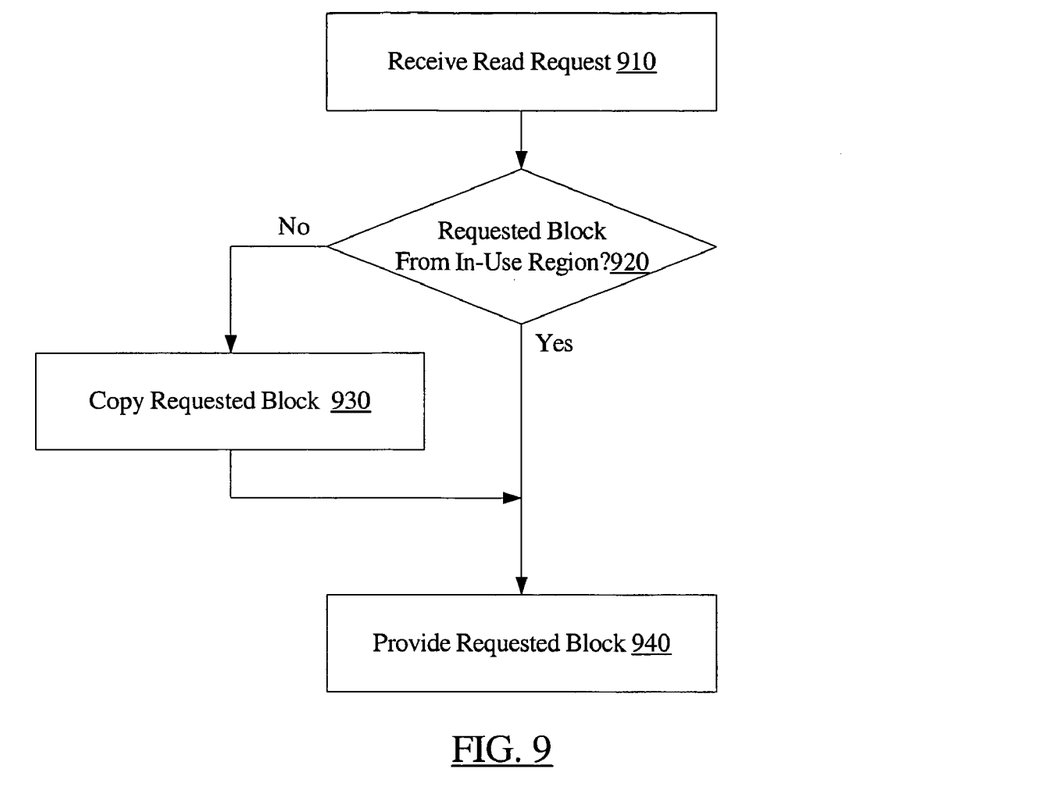
FIG. 9 is a flow diagram illustrating aspects of the operation of a virtual device server configured to identify a read request as a request to read uninitialized data.

A second technique, called "synchronize-mirrors-on-read", may also be employed to make unused regions of a virtual device 140 consistent with each other across the source and target storage device sets 150A and 150B in some embodiments. As illustrated in FIG. 9, when a request to perform a read operation on a block of virtual device 140 is received (block 910) at a virtual device server 130 after a synchronization operation on device 140 has been performed, the virtual device server may check whether the requested block belongs to an in-use region (block 920). If the requested block is not from an in-use region, the request may be identified as a request to read uninitialized data. The data stored in the requested block may be copied from the source storage device set 150A to target storage device set 150B (block 930), and the data may be returned to the requester (block 940). This may ensure that actions taken as a result of accessing an unused or uninitialized data block from the source set of storage devices 150A may be repeatable if the unused or uninitialized data block were later read from the copy stored at the synchronized set of storage devices 150B. In addition, a "synchronize-mirrors-on-read" technique may also be employed for virtual device 140 during file system recovery operations, so that any reads performed by the file system would result in consistency recovery at the block layer. Such a technique may be used in one embodiment, for example, in reconstructing a corrupted bitmap of in-use blocks. In some embodiments, a virtual device client such as a file system may explicitly request that a "synchronize-mirrors-on-read" technique be used, for example during recovery of a corrupted bitmap. While the "synchronize-mirrors-on-read" technique is in use, the in-use map may not be utilized in some embodiments (i.e., the use of the in-use map may be suspended temporarily).

It is noted that a synchronization operation may be required as result of a change (such as a mirror addition) in the configuration of a single virtual device 140 in some embodiments, while in other embodiments the synchronization may be between two or more existing volumes or devices. A synchronization operation may also be performed as a recovery operation after a failure in one embodiment, or to support a data migration (for example, from one data center to another) in another embodiment. It is also noted that in some embodiments, multiple virtual device clients 120 (such as file system 510) may share space within a given virtual device 140, and virtual device server 130 may be configured to obtain a mapping of in-use regions from each virtual device client in such embodiments. In one embodiment, the technique of employing an in-use map as described above may be used where multiple volumes (which may collectively be referred to as a volume set) may be configured for use with a single file system.

In some embodiments, the virtual device server 130 may be configured to divide the virtual storage device 140 into smaller partitions, and to perform synchronization in smaller steps (e.g., one step for each partition). An in-use map corresponding to a given partition, or to the whole virtual storage device, may be obtained prior to each step, and used to identify blocks of the partition that are to be copied during the step. Revalidation of the map (and possible resynchronization of the partition) may be performed for each step. By dividing the synchronization operation into smaller steps in this manner, the likelihood of the maps being invalidated, and the overhead of any required resynchronizations, may be reduced.

In general, a virtual device server 130 may be any device or software module capable of providing virtualization functionality as described above, such as a server computer system, including one or more processors and one or more system memories. Some virtual device server functionality may be spread over multiple computer servers or hosts in some embodiments, or may be provided via devices such as virtualization switches or intelligent disk arrays. To provide high availability for virtual device server functionality, virtual device server 130 may be configured to run on a cluster of nodes, where a failure at one node may result in the virtual device server functionality running on that node to be taken over at another node.

A virtual device client 120 may be any type of device capable of interacting with a given virtual device 140 for data storage and retrieval. For example, in one embodiment a virtual device client 120 may be a server computer system, including one or more processors and one or more system memories, where the server system is configured to execute software such as one or more operating systems and/or applications. In another embodiment, a virtual device client 120 may be a client computer system configured to access a given virtual device 140 via a separate server computer system. A virtual device client 120 may also be hosted within a virtualization switch that provides additional layers of virtualization on top of a virtual device 140. In other embodiments, a virtual device client 120 may be an embedded system configured to use application specific integrated circuit (ASIC) or field-programmable gate array (FPGA) technology to execute operations whereby a given virtual device 140 may be accessed. In some embodiments a virtual device client 120 and a virtual device server 130 may be co-located within the same server. Numerous other configurations of virtual device servers 130, and virtual device clients 120 are possible and contemplated.

Figure 10:
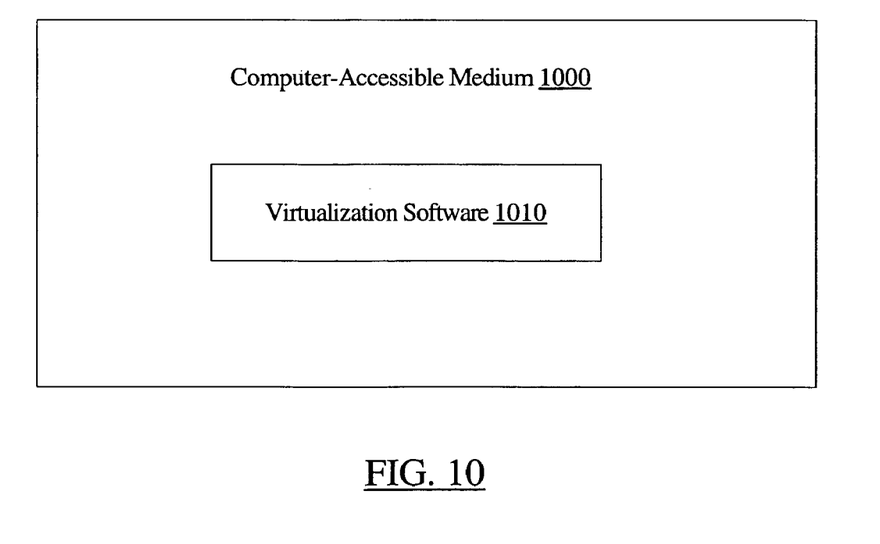
FIG. 10 is a block diagram illustrating a computer-accessible medium.

FIG. 10 shows one embodiment of a computer-accessible medium 1000 comprising virtualization software instructions 1010, which, when executed, accomplish the functionality of a virtual device server 130 and a virtual device client 120 as described above. Generally speaking, the computer-accessible medium may include storage media such as magnetic or optical media such as RAM (e.g., SDRAM, RDRAM, SRAM, etc.), ROM, etc., as well as transmission media or signals such as electrical, electromagnetic or digital signals, conveyed via a communication medium such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   a first and a second set of one or more storage devices;
   a virtual device client; and
   a virtual device server,
   wherein the virtual device server is configured to:
   aggregate storage in the first set of one or more storage devices into a virtual storage device;
   make the virtual storage device accessible to the virtual device client;
   wherein the virtual device client is operable to manage storage within the virtual storage device using a map identifying one or more in-use regions of the virtual storage device, wherein the map is maintained at a first software layer;
   wherein the virtual device server is further configured to:
   obtain the map identifying one or more in-use regions of the virtual storage device from the virtual device client in preparation for a synchronization operation; and
   perform the synchronization operation by copying data from the one or more in-use regions to the second set of one or more storage devices, wherein the synchronization operation is performed at a second software layer different than the first software layer, wherein the map is not visible at the second software layer.

2. The system as recited in claim 1, wherein the virtual device server is a volume manager.

3. The system as recited in claim 1, wherein the virtual device client is a file system.

4. The system as recited in claim 1, wherein the virtual device client is a service that deploys a data update store.

5. The system as recited in claim 1, wherein the virtual device client is a replication manager.

6. The system as recited in claim 1, wherein the virtual storage device is a mirrored logical volume, and wherein the synchronization operation is a mirror synchronization following a mirror attach.

7. The system as recited in claim 1, wherein the virtual storage device is a replication log volume.

8. The system as recited in claim 1, wherein the synchronization operation is a mirror crash recovery operation.

9. The system as recited in claim 1, wherein the synchronization operation is a data migration operation.

10. The system as recited in claim 1, wherein the virtual device server provides object-based virtualization.

11. The system as recited in claim 1, wherein the virtual device server is further configured to revalidate the map after copying the data, and to repeat the synchronization operation if the map is found invalid.

12. The system as recited in claim 1, wherein the virtual device server is further configured to:
   maintain a modification map indicative of a modified region of the virtual storage device; and
   use the modification map in combination with the map identifying one or more in-use regions to identify one or more blocks of the modified region to be copied during the synchronization operation.

13. The system as recited in claim 1, wherein virtual device server is further configured to:
   divide the virtual storage device into a plurality of virtual storage partitions;
   divide the synchronization operation into a plurality of steps, wherein, during each step of the plurality of steps, the virtual device server is further configured to:

obtain a map identifying one or more in-use regions of a virtual storage partition of the plurality of virtual storage partitions from the virtual device client; and copy data from the one or more in-use regions of the virtual storage partition to the second set of one or more storage devices.

14. The system as recited in claim 1, wherein the synchronization operation is an initial volume synchronization performed while a volume is in use and being written.

15. The system as recited in claim 1, wherein the synchronization operation is an initial synchronization of a replica.

16. The system as recited in claim 1, wherein the synchronization operation is a resynchronization of a replica.

17. The system as recited in claim 1, further comprising a backup server, wherein the backup server is configured to:
  obtain the map identifying one or more in-use regions of the virtual storage device from the virtual device client in preparation for a backup operation; and
  perform the backup operation by copying data from the one or more in-use regions to the second set of one or more storage devices.

18. The system as recited in claim 1, wherein the virtual storage device is a mirrored logical volume comprising a first mirror and a second mirror, and wherein, in response to a resynchronize-mirrors-on-read request from the virtual device client, the virtual device server is further configured to copy one or more blocks read from the first mirror to the second mirror.

19. The system as recited in claim 1, wherein the virtual device server is further configured to:
  perform a virtual zeroing operation on a portion of the first set of one or more storage devices that does not overlap with any in-use region of the one or more in-use regions; and
  perform a virtual zeroing operation on a portion of the second set of one or more storage devices that does not overlap with a copy of any in-use region of the one or more in-use regions.

20. A method comprising:
  aggregating storage in a first set of one or more storage devices into a virtual storage device;
  making the virtual storage device accessible to a virtual device client;
  obtaining a map identifying one or more in-use regions of the virtual storage device from the virtual device client in preparation for a synchronization operation on the virtual storage device, wherein the map is maintained at a first software layer; and
  performing the synchronization operation by copying the one or more in-use regions of the virtual storage device to the second set of one or more storage devices, wherein the synchronization operation is performed at a second software layer different than the first software layer, wherein the map is not visible at the second software layer.

21. The method as recited in claim 20, wherein the virtual device client is a file system.

22. The method as recited in claim 20, wherein the virtual storage device is a logical volume.

23. The method as recited in claim 20, wherein the virtual storage device is a mirrored logical volume, and wherein the synchronization operation is a mirror synchronization following a mirror attach.

24. The method as recited in claim 20, further comprising:
  revalidating the map after copying the data.

25. The method as recited in claim 20, further comprising:
  performing a virtual zeroing operation on a portion of the first set of one or more storage devices that does not overlap with any in-use region of the one or more in-use regions; and
  performing a virtual zeroing operation on a portion of the second set of one or more storage devices that does not overlap with a copy of any in-use region of the one or more in-use regions.

26. A computer-accessible memory medium comprising program instructions, wherein the program instructions are computer-executable to:
  aggregate storage in a first set of one or more storage devices into a virtual storage device;
  make the virtual storage device accessible to a virtual device client;
  obtain a map identifying one or more in-use regions of the virtual storage device from the virtual device client in preparation for a synchronization operation on the virtual storage device, wherein the map is maintained at a first software layer by the virtual device client; and
  perform the synchronization operation by copying the one or more in-use regions of the virtual storage device to the second set of one or more storage devices, wherein the synchronization operation is performed at a second software layer different than the first software layer, wherein the map is not visible at the second software layer.

27. The computer-accessible memory medium as recited in claim 26, wherein the virtual device client is a file system.

28. The computer-accessible memory medium as recited in claim 26, wherein the virtual storage device is a logical volume.

29. The computer-accessible memory medium as recited in claim 26, wherein the virtual storage device is a mirrored logical volume, and wherein the synchronization operation is a mirror synchronization following a mirror attach.

30. The computer-accessible memory medium as recited in claim 26, further comprising program instructions computer-executable to:
  revalidate the map after copying the data.

31. The computer-accessible memory medium as recited in claim 26, further comprising program instructions computer-executable to:
  perform a virtual zeroing operation on a portion of the first set of one or more storage devices that does not overlap with any in-use region of the one or more in-use regions; and
  perform a virtual zeroing operation on a portion of the second set of one or more storage devices that does not overlap with a copy of any in-use region of the one or more in-use regions.

* * * * *